UNITED STATES PATENT OFFICE.

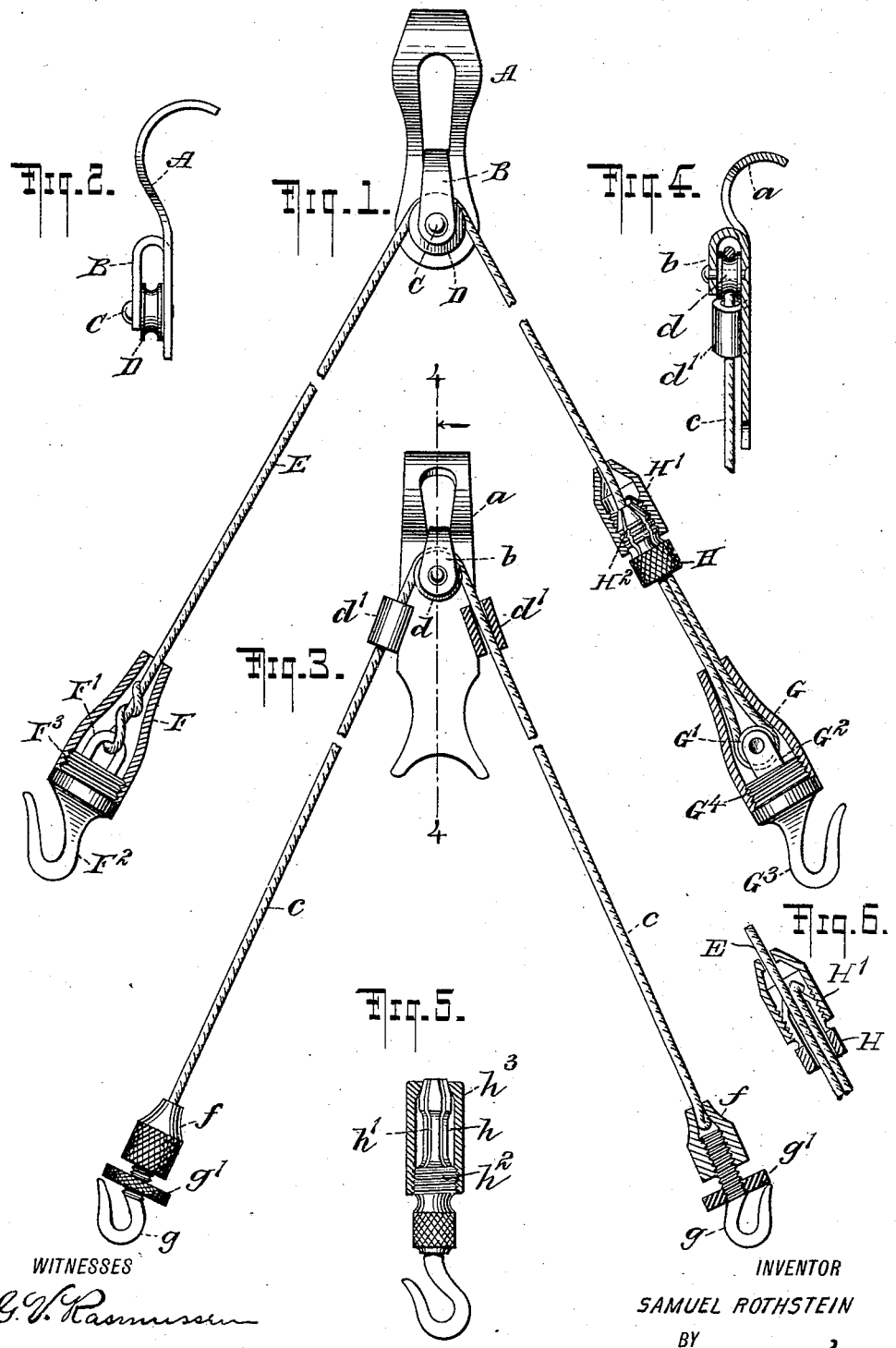

SAMUEL ROTHSTEIN, OF NEW YORK, N. Y.

DEVICE FOR HANGING PICTURES AND SIMILAR ARTICLES.

969,195.      Specification of Letters Patent.      Patented Sept. 6, 1910.

Application filed December 26, 1908. Serial No. 469,442.

*To all whom it may concern:*

Be it known that I, SAMUEL ROTHSTEIN, a citizen of the United States, and resident of the borough of Manhattan, city, county, and State of New York, have invented certain new and useful Improvements in Devices for Hanging Pictures and Similar Articles, of which the following is a specification.

My invention relates to devices for hanging pictures and similar articles and has for its object to provide a simple and effective device of this character in which the wire or cord is easily adjustable to different lengths and which presents a neat and finished appearance and is readily connected with the article to be suspended.

Other objects of my invention will appear from the specification hereinafter and the features of novelty will be pointed out in the appended claims.

Reference is to be had to the accompanying drawings in which—

Figure 1 is an elevation of my improved device; Fig. 2 is a side view of the molding hook; Fig. 3 is a view similar to Fig. 1 of a slightly different form of my invention; Fig. 4 is a sectional view on the line 4—4 of Fig. 3; Fig. 5 is an elevation partly in section of another form of hook used in my invention; and Fig. 6 is a detail sectional view of the clamping device shown in Fig. 1.

Referring more particularly to Figs. 1 and 2 of the drawing, A represents the molding hook arranged to take over the usual molding in the customary manner. A tongue B is stamped from the body of the hook and bent downwardly to form a bearing for one end of an axle C on which a roller D is journaled. The other end of the axle C is secured in the body of the hook A. A cord or wire E passes over the roller D and through a sleeve F and has its one end fastened to an eyelet F′ forming part of or secured to a hook F². This hook is provided with a screw-threaded portion F³ on which the sleeve F is adapted to be screwed. The point of connection of the wire or cord E is thus concealed when the parts are connected. The other end of the wire or cord E passes through a sleeve G similar to the sleeve F, and over a roller G′ journaled between lugs G² which form part of a second hook G³. The cord or wire E passes from the roller G′ back through the sleeve G and has its end secured in a clamping member H. This member H is capable of sliding along the wire or cord E and is secured at any point along said wire by a clamping nut H′ which screws on the screw-threaded end of said clamping member. This clamping member is split as indicated at H² so as to clamp the wire when the nut H′ is screwed down. The hook G³ is also provided with a screw-threaded portion G⁴ similar to the portion F³ and adapted to receive the sleeve G. When these parts are connected, the roller G′ is hidden. To lengthen or shorten the wire or cord the nut H′ is unscrewed and the member H is moved up or down on the wire E until the desired length is obtained. The nut H′ is then again screwed upon the member H which is thus securely held against any further movement lengthwise of the wire or cord. As the wire is lengthened or shortened it passes freely over the roller G′ without binding. By mounting the roller D between the tongue B, and the body of the said molding hook the tongue extends over the said roller and forms a guard therefor. It is thus impossible for the cord or wire to accidentally slip off the said roller D in a direction parallel with the roller's axis.

In the form of my invention shown in Figs. 3 and 4 of the drawings the molding hook *a*, in addition to the tongue *b* and the roller *d*, is provided with cylindrical guides *d′* secured thereto and oppositely inclined. The wire *c* passes through these guides and has its ends secured in screw-threaded caps *f*. The ends of the wire *c* may be knotted or simply bent to prevent the wire from being pulled out of said caps which are internally screw-threaded to receive the ends of the hooks *g*. A disk *g′* is mounted to move up and down on the shanks of the hooks *g* and serves to close the said hooks to prevent accidental disengagement of the hooks and the suspended article. In other words after the hooks *g* have been engaged with the article to be suspended the disk *g′* is screwed down as shown in Fig. 3. The disk may be adjusted to different points on said hooks by simply rotating it. Otherwise this form of my device may be the same as the one shown in Figs. 1 and 2. In use, the wire after passing through the guides *d′* is bent at a sharp angle, thus being firmly held against accidental movement when the picture is once adjusted in an upright position; it is therefore not easily disturbed. By bringing the wire into axial alinement with the guides it may be freely pulled back and forth over the roller $d$.

The hook shown in Fig. 5 comprises a neck portion $h$ which is longitudinally split in several places as indicated at $h'$ and has a screw-threaded portion $h^2$. When this form of hook is used the ends of the wire, either knotted or otherwise, are first passed through a locking collar $h^3$ and then inserted into the neck portion $h$. After this has been done the collar $h^3$ is screwed down on the said portion thus forcing the split members thereof together to securely grip the wire or cord and at the same time cover the points of connection.

My invention thus provides a suspending device which presents a neat and finished appearance and is easily applied and adjusted to hang pictures and similar articles at various and different levels.

I claim:

1. A suspending device comprising a supporting hook, a stud projecting upwardly from said hook, a roller journaled on said stud, members adapted to be secured to the article to be suspended, a flexible connection between said members arranged to travel over said roller, and sleeves engaging said members to conceal the points of engagement of the flexible connection with said members.

2. A suspending device comprising suspending members arranged to engage the article to be suspended, a flexible connection between them, removable devices on said flexible connection arranged to engage the suspending members for concealing the points of connection of the suspending members with the flexible connection.

3. A suspending device comprising a suspending member, a flexible support having its one end secured to said member, a device adjustably mounted on said flexible support to vary the length thereof and to which the other end of said flexible support is secured, a second suspending member and a roller journaled on said second suspending member over which said flexible support is adapted to travel as the said device is adjusted to vary the length of said flexible support.

4. A suspending device comprising a flexible support arranged to engage the article to be suspended and a resilient device through which said support passes and in which one end of said support is secured and means for clamping said device in position on said support.

5. A suspending device comprising a member adapted to engage the article to be suspended, a flexible support movably engaging said member and a clamping device slidably mounted on said support to move the same relatively to said member to vary the length of the flexible support, said clamping device comprising a resilient tubular member in which the one end of said support is secured and a clamp for clamping said device in position.

6. A suspending device comprising a member arranged to engage the article to be suspended, a roller journaled thereon, a flexible support adapted to travel over said roller and a clamping device arranged to slide on said support to vary its length and comprising a tubular member in which the end of the support is secured, and a nut arranged to engage said tubular member for clamping it in position.

7. A suspending device comprising screw-threaded suspending members arranged to engage the article to be suspended, a flexible connection between said suspending members, screw-threaded removable devices on said flexible connection arranged to engage the screw-threaded suspending members for concealing the points of connection of the suspending members with the flexible connection.

In testimony whereof I have hereunto signed my name in the presence of two subscribing witnesses.

SAMUEL ROTHSTEIN.

Witnesses:
 JOHN A. KEHLENBECK,
 JOHN LOTKA.